READ & SMITH.
Broiler and Toaster.
No. 110,589.
Patented Dec. 27, 1870.
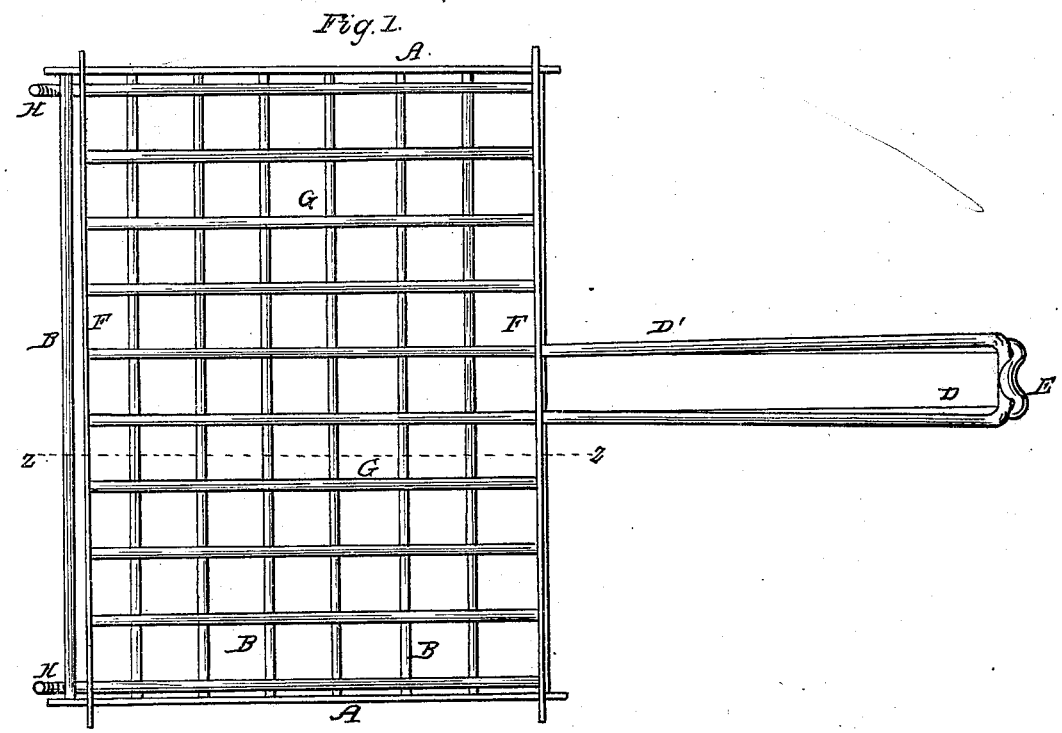
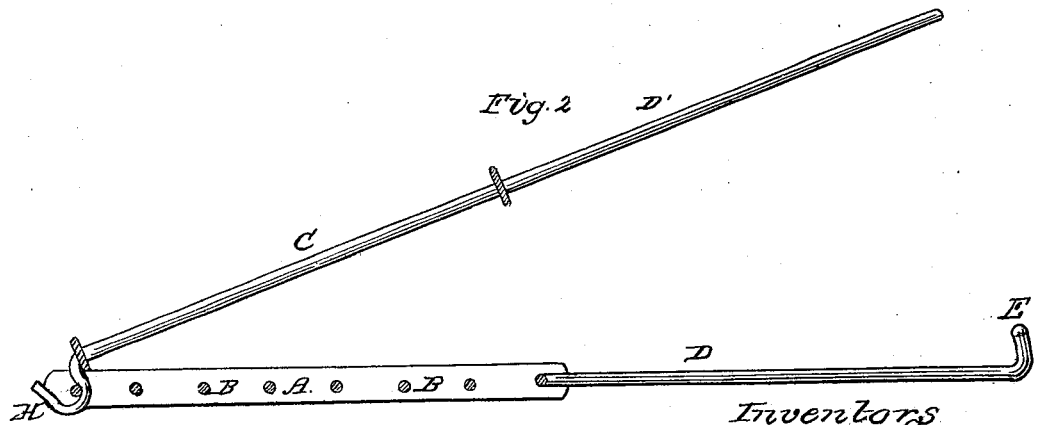

United States Patent Office.

JOSIAH M. READ AND JOHN M. SMITH, OF BOSTON, MASSACHUSETTS.

Letters Patent No. 110,589, dated December 27, 1870.

IMPROVEMENT IN BROILERS AND TOASTERS.

The Schedule referred to in these Letters Patent and making part of the same.

We, JOSIAH M. READ and JOHN M. SMITH, both of Boston, Suffolk county, State of Massachusetts, have invented certain Improvements in Gridiron and Toaster, of which the following is a specification.

The nature and object of our improvements are to make a cheap, convenient, and durable gridiron and toaster combined, as shown in the accompanying drawing.

Figure 1 is a plan or top view of a gridiron with our improvements.

Figure 2 is a section to the right of the line $z\ z$ on fig. 1.

In the drawing—

A A are two flat bars, perforated to receive the ends of the round bars B B, which are fastened in the flat bars by riveting or otherwise, to make a firm, strong frame.

One of the side bars B is bent in the middle to form a loop for a handle, D, and the end of the loop is turned up to form a catch, E, for the other part of the handle. The part above described we call the bottom or under side of the gridiron.

We make the top of the gridiron by perforating two long flat bars F F and inserting the short round bars G G in the perforations and fastening them, by riveting or otherwise.

The two side bars G G are made to extend through the bar F, and are bent down and formed into hooks H H, which are hooked under the far-side bar B, to hinge the top and bottom parts together, so that they may be opened and closed when desired.

The two middle bars, G G, are made by looping a single bar long enough to form a handle, D', parallel to the handle D before mentioned.

The end of the loop or handle D* is bent square across so as to be pressed under the catch E and hold the handles of the top and bottom parts together after the meat or bread is placed between them for broiling or toasting.

By the construction and arrangement described the bars G G cross the bars B B so as to more effectually hold the meat or bread placed between them, and the flat bars F F form flanges at the sides, and the flat bars A A form flanges at the ends, to prevent the meat or bread from falling out when the instrument is turned.

To put the meat or bread in, separate the handles and lift up the top part, and lay the meat on the bottom part, and shut the top down upon it, and catch the handles together to hold it fast.

We claim—

The above-described gridiron and toaster, with spring catch E in the handle, flat bars F F at the sides and flat bars A A at the ends, and the two parts hinged together by the hooks H H, substantially as described.

JOSIAH M. READ.
JOHN M. SMITH.

Witnesses:
  GEO. WM. ESTABROOK,
  T. L. WAKEFIELD.